United States Patent [19]

McLeod

[11] 4,448,540
[45] May 15, 1984

[54] APPARATUS FOR MIXING A LIQUID ADDITIVE COMPOUND WITH VAPOR AND LIQUID PHASES OF ANHYDROUS AMMONIA

[75] Inventor: David M. McLeod, Midland County, Mich.

[73] Assignee: The Dow Chemical Company, Midland, Mich.

[21] Appl. No.: 385,195

[22] Filed: Jun. 4, 1982

[51] Int. Cl.$^3$ .................. B01F 15/02; B01F 15/04
[52] U.S. Cl. .................. 366/160; 366/177; 366/183; 366/184; 366/338
[58] Field of Search .................. 48/180 R, 180 B; 137/561 A, 896; 261/78 A, 117; 366/9, 136, 137, 150, 154, 160, 167, 173, 174, 177, 183, 184, 336, 337, 338; 422/224; 138/37, 39

[56] References Cited

U.S. PATENT DOCUMENTS

| | | | |
|---|---|---|---|
| 2,977,205 | 3/1961 | Austin | 48/180 R |
| 3,276,753 | 10/1966 | Solt et al. | 366/136 |
| 3,827,678 | 8/1974 | Andrews | 366/154 |
| 4,222,524 | 9/1980 | Garcia | 138/37 |
| 4,259,021 | 3/1981 | Goudy, Jr. | 366/337 |
| 4,374,813 | 2/1983 | Chen et al. | 261/117 |

Primary Examiner—Robert W. Jenkins
Assistant Examiner—Arthur D. Dahlberg
Attorney, Agent, or Firm—V. Dean Clausen

[57] ABSTRACT

An apparatus is disclosed which is useful for mixing ammonia, in a vapor-liquid phase, with an additive composition, in a liquid phase, to obtain a homogeneous vapor-liquid mixture of the anhydrous ammonia and the liquid additive compound. The apparatus described herein is particularly suitable for use in a field applicator, for applying the anhydrous ammonia to the soil, as a nitrogen fertilizer, in combination with an additive, such as a nitrogen stabilizer. In operation, the vapor-liquid ammonia stream is metered through a meter regulator and then passed downwardly into a mixing chamber. Below the meter regulator is a delivery tube through which the liquid additive is metered into the ammonia stream before entering the mixing chamber. Inside the mixing chamber the ammonia-additive stream is further mixed to obtain a homogeneous mixture, which is then passed downwardly into a distribution chamber. From this chamber the mixture is delivered to a use point, such as a row of soil knives in a field applicator.

4 Claims, 6 Drawing Figures

APPARATUS FOR MIXING A LIQUID ADDITIVE COMPOUND WITH VAPOR AND LIQUID PHASES OF ANHYDROUS AMMONIA

BACKGROUND OF THE INVENTION

The invention relates to an apparatus for mixing a liquid additive compound with anhydrous ammonia in a vapor phase and a liquid phase to obtain a homogeneous vapor-liquid mixture of the ammonia and liquid additive which can be applied uniformly to soil and other materials.

It is common practice to apply anhydrous ammonia to the soil as a nitrogen fertilizer. Recently, there has been an interest in using the anhydrous ammonia as a vehicle for applying other materials to the soil, such as herbicides, micronutrients, pesticides, and nitrogen stabilizers. Conventional field applicators for applying the ammonia-additive mixture include storage tanks for the ammonia and the additive, a meter regulator for the ammonia, a metering pump for the additive, a flow equalizer manifold having a fixed or variable orifice, and a row of knives which are pulled through the soil at a depth of several inches. In a typical field application, the ammonia is stored in the ammonia tank at about 100-200 psig, at ambient temperature. As the ammonia is metered through the regulator and into the flow equalizer manifold, the pressure drops to about 5-30 psig. Because of the pressure drop through the regulator, most of the ammonia is in the vapor phase when it leaves the regulator and enters the manifold. At this point the ammonia composition is about 90 percent vapor and 10 percent liquid ammonia on a volume basis.

From the meter regulator, the ammonia is carried into the flow equalizer manifold through a connector pipe which connects the regulator with a mixing chamber. The manifold structure includes a distribution chamber, which is a circular chamber having openings in the sidewall therein and a cone-shaped bottom. Flexible applicator hoses connect the chamber wall openings to the soil knives. Inside the chamber, is an orifice sleeve which seats against the chamber wall. This sleeve has openings in it which are smaller than the openings in the chamber wall and the sleeve openings line up with those in the chamber wall.

As the ammonia passes through the connector pipe, the additive compound is injected by the metering pump into the ammonia stream at a point in the pipe which is below the meter regulator and above the flow equalizer manifold. This is referred to as the "downstream injection" of the additive and it is done to prevent chemical breakdown or cross-contamination problems which could occur if the additive was premixed with the ammonia in the ammonia storage tank. However, the liquid additives referred to earlier, for example, nitrapyrin, which is a nitrogen stabilizer, do not readily mix with the vapor-liquid ammonia stream in the downstream injection step.

At least part of the mixing problem is caused by the fact that the centrifugal force tends to move the liquid phases to the outside of the connector pipe, such that they move in a helical flow pattern. This action causes the product stream to separate into three distinct phases, namely, the liquid and vapor phases of the ammonia and the separate liquid phase of the additive. Since the product stream enters the manifold chamber as a three-phase system, there is a very poor distribution of the components through the applicator hoses into the soil knives. The poor distribution is caused by the same centrifuging effect, which causes the heavier liquid phases to be thrown to the outside of the manifold chamber. Therefore, as the liquid travels around the chamber, most of it discharges through the first few openings it crosses in the orifice sleeve and the chamber sidewall. At the same time, the vapor phase of the ammonia leaves the manifold through those openings which offer the least amount of resistance.

From a study of the problem described above, it was concluded that the three-phase stream must be intercepted and homogenized before it enters the flow equalizer manifold, to improve the distribution of the components to the soil knives. In the practice of this invention, a much better distribution of the product to the soil knives is achieved by modifying the conventional field applicator, which is generally used for the field application of ammonia fertilizer compositions which also contain an additive composition, such as a nitrogen stabilizer.

SUMMARY OF THE INVENTION

The apparatus of this invention is designed for mixing vapor and liquid phase anhydrous ammonia streams with a stream containing a liquid additive compound, to obtain a homogenous vapor-liquid mixture of the anhydrous ammonia and the liquid additive compound. The basic apparatus includes a meter regulator and a flow equalizer manifold. Between the meter regulator and flow equalizer manifold is a mixing chamber, which is connected into the meter regulator by a first conduit section. The apparatus includes a second conduit section having an upper end which is positioned inside the mixing chamber, and this end is defined by a cone-shaped cap attached to the upper lip of the second conduit section by strut members. The strut members are spaced apart to define fluid inlet passages in the upper end, and the lower end of the conduit section connects into the flow equalizer manifold.

A distribution chamber is defined within the flow equalizer manifold by a top wall, a floor, and a sidewall. The chamber floor has a cone-shaped surface and the sidewall has outlet openings therein which communicate with a use point. In one embodiment of the invention, the distribution chamber includes an orifice sleeve which surrounds the cone-shaped surface and which seats against the sidewall of the chamber. The orifice sleeve also has openings therein which communicate with the outlet openings in the chamber sidewall. A flow integrator ring is also positioned inside the orifice sleeve and it seats on the cone-shaped surface of the chamber floor. The apparatus also includes a delivery tube, in which the delivery end of the tube has an outlet opening in the wall of the tube. The delivery end is positioned in the first conduit section between the meter regulator and the mixing chamber, and in one embodiment of the invention, the opening in the delivery end faces toward the meter regulator.

In another embodiment of this invention, the distribution chamber is identical to that described above, except that it does not include an orifice sleeve or a flow integrator ring.

DESCRIPTION OF A PREFERRED EMBODIMENT

Figure 1:
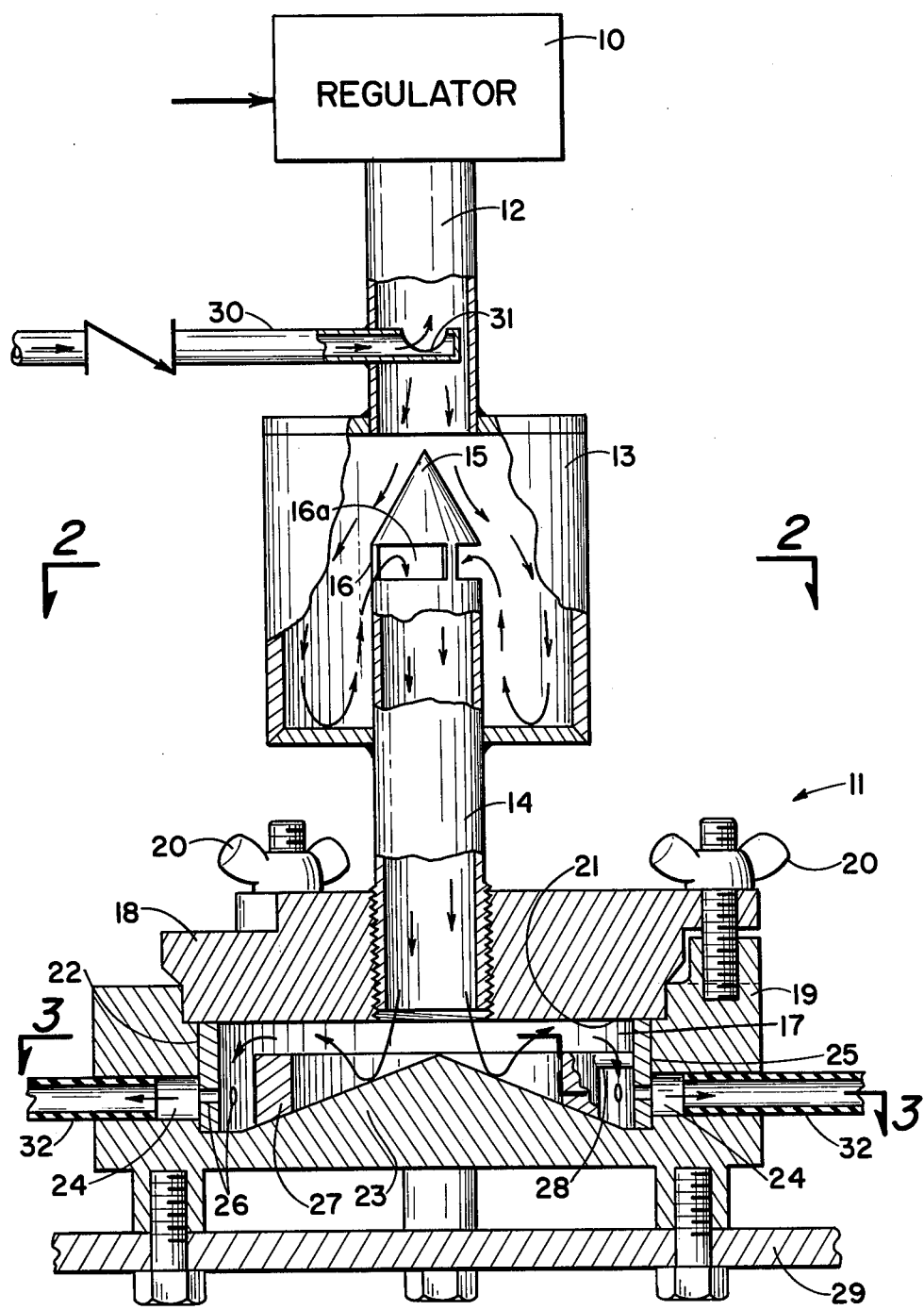
FIG. 1 is an elevation view, mostly in section, and partly schematic, of the mixing apparatus of this invention.
Figure 2:
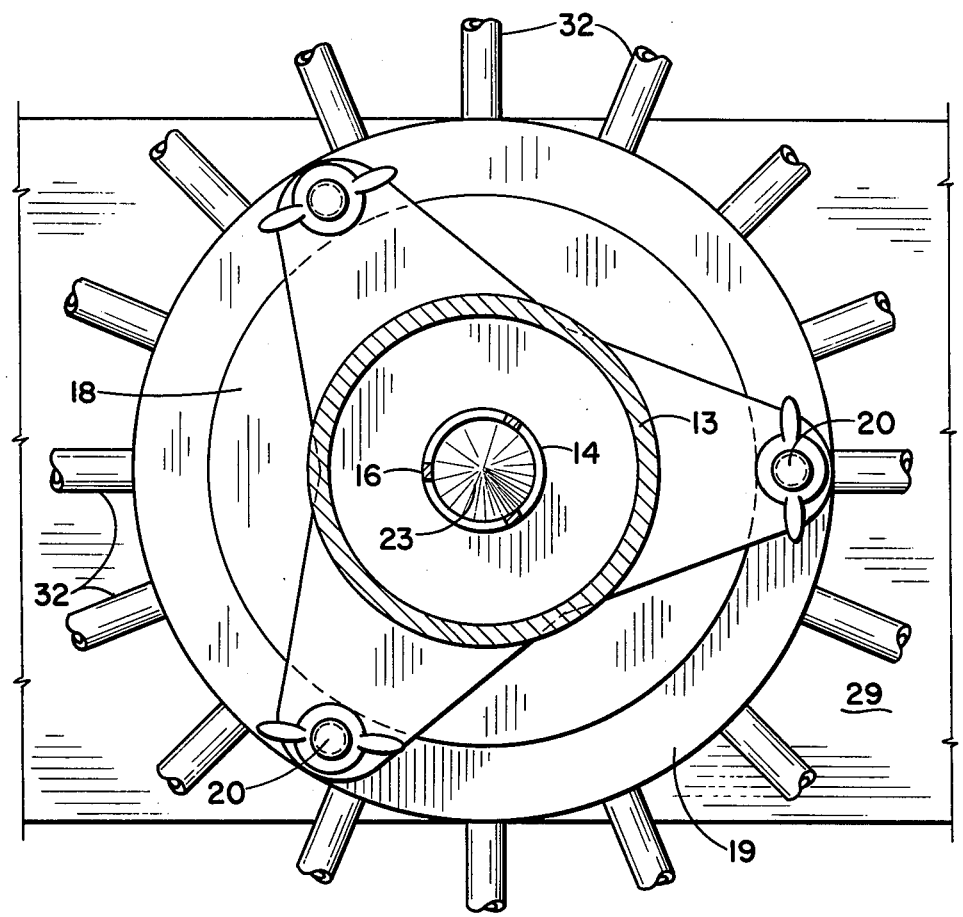
FIG. 2 is a view of the mixing apparatus of FIG. 1, as taken on line 2—2.
Figure 3:
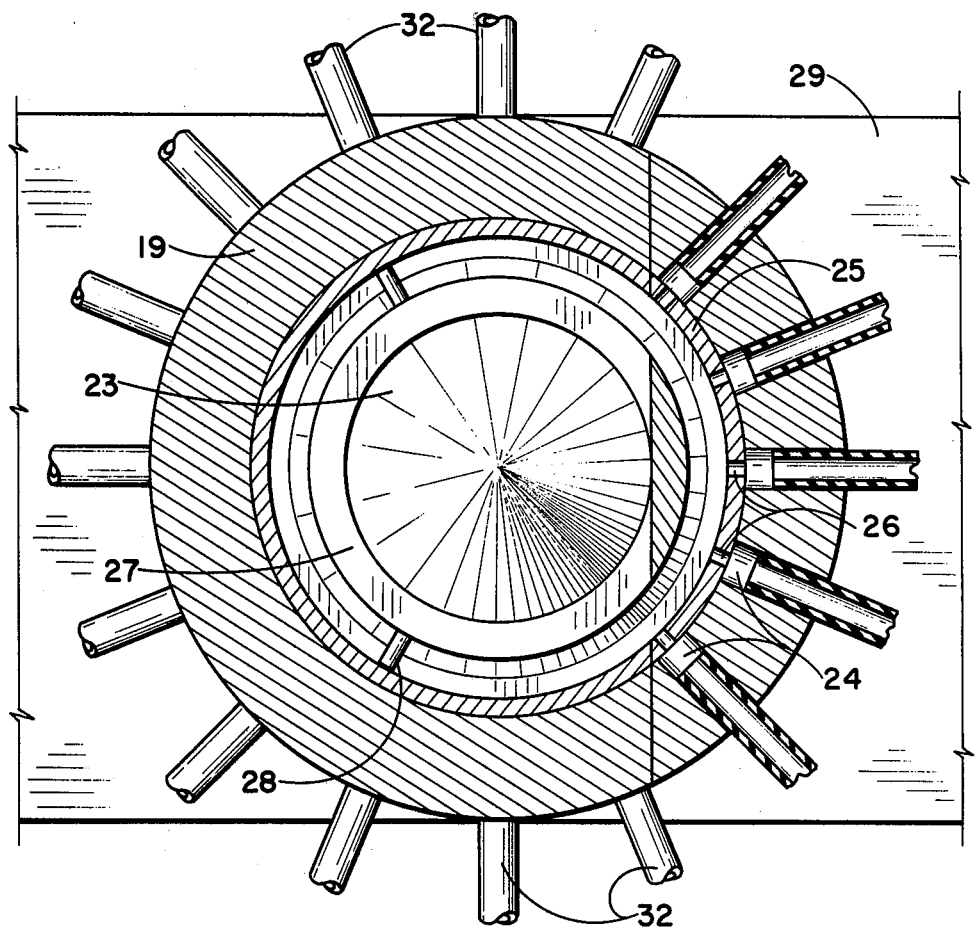
FIG. 3 is a view of the mixing apparatus of FIG. 1, as taken on line 3—3.

In the drawings, referring particularly to FIG. 1, the mixing apparatus of this invention is generally indicated by the letter M. The basic apparatus consists of a meter regulator 10 and a flow equalizer manifold, generally indicated by numeral 11. A first conduit section 12 connects the meter regulator 10 into a mixing chamber 13. The upper end of a second conduit section 14 is positioned inside the mixing chamber 13. This end of the second conduit section is defined by a cone-shaped cap 15, which is attached to the upper lip of the conduit by several strut members 16.

The strut members are spaced apart, such that they define fluid inlet passages 16a in the upper end of the second conduit section 14. The lower end of the second conduit section is fastened into a distribution chamber 17 defined within the manifold 11. Chamber 17 is defined by a cover plate 18, which is secured to a body member 19 by several stud and wing nut fasteners 20. Specifically, the top wall 21 of chamber 17 is formed by the bottom surface of cover plate 18, and a circular opening in body member 19 forms the sidewall 22 and floor 23 of the chamber 17. As noted in the drawing, the floor 23 of chamber 17 has a cone-shaped surface and sidewall 22 has outlet openings 24 therein which are spaced around the sidewall.

An orifice sleeve 25 is positioned inside of chamber 17. This sleeve surrounds the cone-shaped surface of the chamber floor 23 and the outside of the sleeve sits against the chamber sidewall 22. Sleeve 25 also has openings 26 therein, which communicate with the openings 24 in sidewall 22. Manifold 11 also includes a flow integrator ring 27. As best shown in FIG. 1, the ring is positioned inside the orifice sleeve 25 and it seats down onto the cone-shaped surface of the chamber 19. The ring 27 is held in a central position on the cone-shaped surface by pin members 28, which are fastened onto the ring and which make contact with the orifice sleeve 25.

Manifold 11 is attached to a mounting plate 29, which is a part of the field applicator (not shown). Above the mixing chamber 13 is a delivery tube 30, which provides means for injecting the additive compound into the ammonia. The delivery end of the tube is positioned inside the first conduit section 12 between the meter regulator 10 and the mixing chamber 13. As shown in FIG. 1, there is an outlet opening 31 in the wall of the delivery tube at the delivery end.

Figure 4:
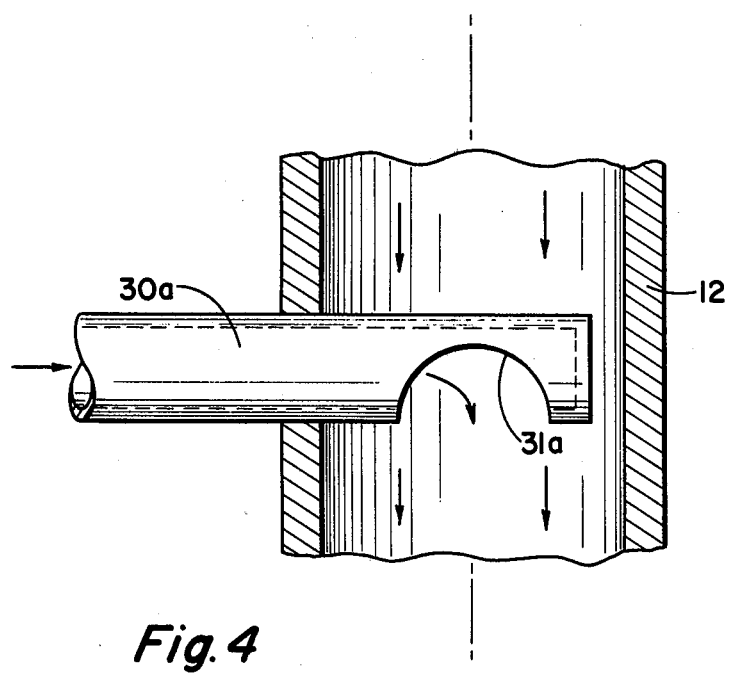
FIG. 4 is a detail view of a second embodiment of a delivery tube of the mixing apparatus shown in FIG. 1.
Figure 5:
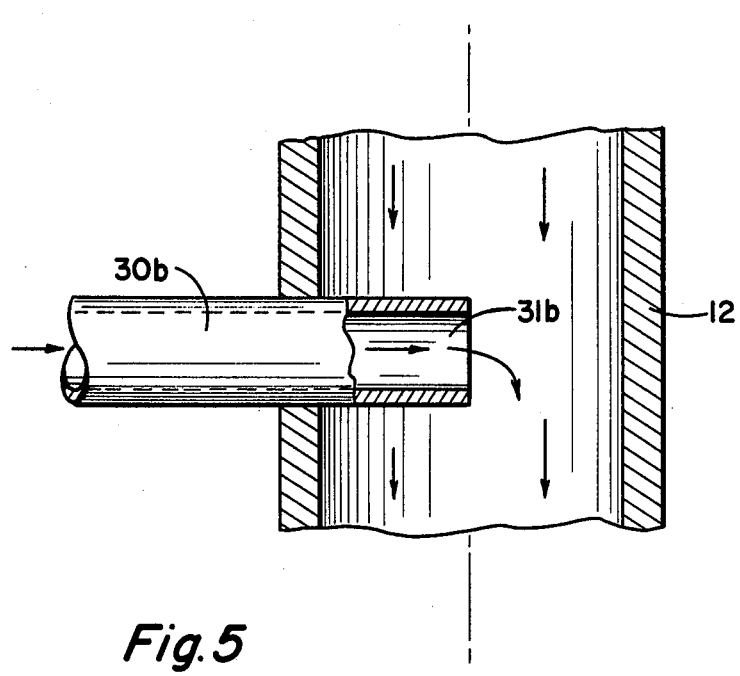
FIG. 5 is a detail view of a third embodiment of the delivery tube of the mixing apparatus shown in FIG. 1.

In the embodiment of FIG. 1, the outlet opening faces upwardly, that is, toward the meter regulator 10. Additional embodiments of the delivery tube are illustrated in FIGS. 4 and 5. Referring to FIG. 4, the delivery tube 30a has an outlet opening 31a therein which faces downwardly, that is, toward the mixing chamber 13. In FIG. 5 the delivery tube 30b is a section of tube which has an open end 31b. In this embodiment the open end is positioned about the center of the first conduit section 12, for best results in mixing the additive compound with the ammonia.

Figure 6:
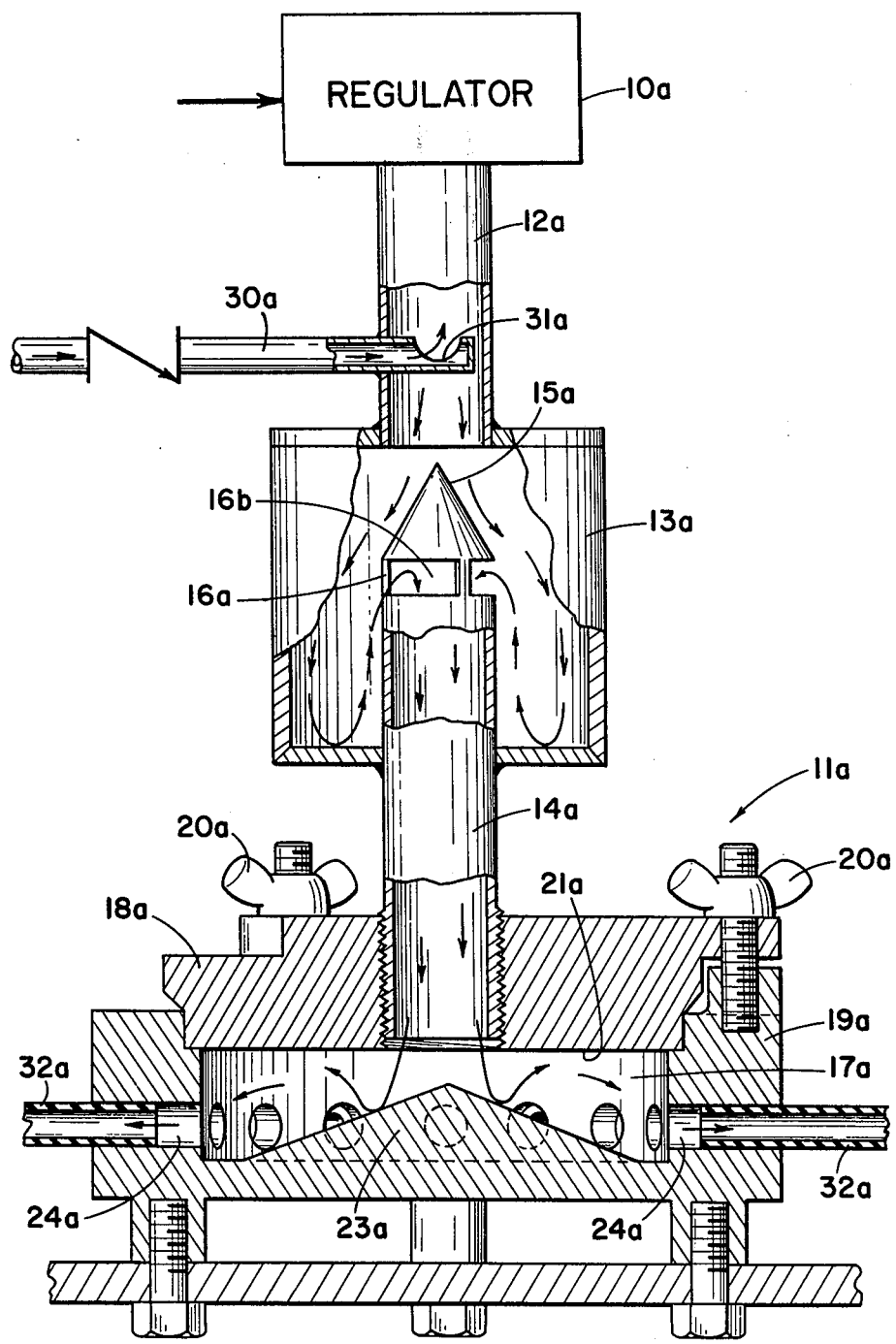
FIG. 6 is an elevation view, mostly in section, and partly schematic, of a second embodiment of the mixing apparatus of this invention.

A second embodiment of the ammonia-additive mixing apparatus of this invention is illustrated in FIG. 6. This embodiment is identical in structure to the apparatus shown in FIG. 1, except that the distribution chamber (numeral 17 in FIG. 1), does not include the orifice sleeve (numeral 25 in FIG. 1) and the flow integrator ring (numeral 27 in FIG. 1). The reference numerals of FIG. 6 are the same as those of FIG. 1, but they each include the suffix "a" to indicate identification of the similar parts in each embodiment.

OPERATION

The invention can be illustrated by describing a typical operation in which anhydrous ammonia and a liquid additive are applied to the soil. For the purpose of this example, the operation was conducted using the apparatus illustrated in FIG. 1, and the liquid additive is a nitrogen stabilizer sold under the name N-SERVE 24, in which the active ingredient is nitrapyrin. At the start of the operation the anhydrous ammonia is metered from the storage tank on the field applicator (not shown) through the meter regulator 10. From the regulator 10, the two-phase ammonia stream (vapor-liquid) passes downwardly through the first conduit section 12. At the same time, the nitrogen stabilizer (liquid) stream is injected through the delivery tube 30 into the ammonia stream at a point in conduit section 12 which is just above the cap 15 on the second conduit section 14.

The resulting three-phase stream moves downwardly and strikes the cone-shaped cap 15, so that the fluid stream is split or divided. After the stream divides, the fluids hit the bottom and sides of the mixing chamber 13 and bounce upwardly, where they mix with the downwardly moving stream from the first conduit section 12. This action initiates a good mixing of the three-phase stream and the homogeneous mixture then passes through the fluid inlet passages 16a and falls into the distribution chamber 17 of the flow equalizer manifold 11.

A further mixing of the ammonia-additive stream takes place in the distribution chamber 17. This is achieved primarily because the flow integrator ring 27 acts as a restraining device to create a back pressure on the ammonia-additive mixture. Specifically, ring 27 provides a dam which holds back some of the fluid in the distribution chamber 17, particularly the liquid phase, long enough for it to thoroughly mix with the incoming vapor and liquid before the fluid has a chance to push through the openings 26 in the orifice sleeve and the openings 24 in the sidewall of the distribution chamber and thus be carried into the soil knives (not shown) through the applicator hoses 32.

In the practice of this invention several field tests were conducted to determine the effect on distribution of the ammonia-additive product to the soil knives, as produced by the mixing chamber 13, the flow integrator ring 27, and the various embodiments of the delivery tube 30. The procedure for collecting the distribution data involved installing a removable metal coil on the field applicator above each soil knife (between the flow equalizer manifold and each knife). As the applicator is pulled across a field, the ammonia and nitrapyrin composition is trapped in each coil. The coil is then removed and weighed with the mixture of ammonia and nitrapyrin remaining in the coil. The coil is then vented slowly to remove the ammonia and the weight of each coil is recorded to determine the amount of anhydrous ammonia that had been trapped in each coil. The residual nitrapyrin is then flushed out of the coil and analyzed, using a gas chromatograph.

In the first series of tests, a conventional field applicator was used to apply an ammonia and nitrapyrin composition to the soil. This applicator did not include the mixing chamber 13 or the flow integrator ring 27. The nitrapyrin was added to the ammonia stream from the meter regulator 10 with a conventional delivery tube (referred to in the industry as a spoon), in which the opening 31 was turned upwardly toward the meter regulator 10, as shown in FIG. 1. In these tests, the amount of ammonia-nitrapyrin delivered to each soil knife had an average coefficient of variation which ranged from 120 percent to 160 percent, weight basis.

Several other series of tests were then conducted in which the field applicator included different combinations of the various components of the mixing apparatus, namely, the mixing chamber 13, the orifice sleeve 25, the flow integrator ring 27, and one of the delivery tubes as illustrated in FIG. 1, 4, or 5. For example, in one series of tests the components used in the field applicator included the orifice sleeve, the flow integrator ring, and the delivery tube shown in FIG. 1, but did not include the mixing chamber 13. In another series the components used were the orifice sleeve, the flow integrator ring, the mixing chamber, and the delivery tube. In another series of tests the components included the delivery tube and the mixing chamber, but the orifice sleeve and the flow integrator ring were omitted from the distribution chamber (note the embodiment shown in FIG. 6). In another group of tests only the orifice sleeve was omitted from the distribution chamber.

The data obtained from these tests indicated that when the mixing chamber, the orifice sleeve, and the flow integrator ring are used in the field applicator, the coefficient of variation of the product distribution to the soil knives was about 2 percent to 7 percent, weight basis. In those tests in which the orifice sleeve was used and the flow integrator ring was omitted, or conversely, the flow integrator ring was used and the orifice sleeve was omitted, the coefficient of variation ranged from about 13 percent to 26 percent, weight basis. The tests also indicated that distribution of the ammonia-additive composition was directly affected by the structure of the delivery tube.

For example, the best distribution of the ammonia-additive composition was achieved using the configuration of the delivery tube 30, as illustrated in FIG. 1, in which the opening 31 faces upwardly toward the meter regulator. Distribution was not as good when the delivery tube, as illustrated in FIG. 4, was used, and it was even poorer when the injection of the additive was made perpendicular to the ammonia flow, as with the delivery tube illustrated in FIG. 5.

The invention claimed is:

1. An apparatus for mixing a stream of anhydrous ammonia, having a vapor and liquid phase, with a stream containing a liquid additive compound, to obtain a homogeneous vapor-liquid mixture of the anhydrous ammonia and the liquid additive compound, the apparatus comprising:
    a meter regulator means;
    a mixing chamber;
    a first conduit section which connects the meter regulator to the mixing chamber;
    a second conduit section having upper and lower ends, the upper end in positioned inside the mixing chamber, the upper end is defined by a cone-shaped cap attached to the upper lip of the second conduit section by strut members, the strut members are spaced apart to define fluid inlet passages in said upper end, and the lower end connects into a flow equalizer manifold;
    the flow equalizer manifold includes a distribution chamber defined by a top wall, a floor, and a sidewall, the distribution chamber floor has a cone-shaped surface, and the distribution chamber sidewall has outlet openings therein which communicate with a use point;
    the flow equalizer manifold includes an orifice sleeve, the sleeve is positioned inside the distribution chamber, it surrounds the cone-shaped surface, it is in contact with the chamber sidewall, and it has openings therein which communicate with the outlet openings in the chamber sidewall;
    the flow equalizer manifold includes a flow integrator ring, the flow integrator ring is positioned inside the orifice sleeve, and it seats on the cone-shaped surface of the distribution chamber floor;
    the apparatus includes a delivery tube, the tube has a delivery end positioned in the first conduit section between the meter regulator and the mixing chamber, and the delivery end has an outlet opening in the wall of the tube which faces toward the meter regulator.

2. The apparatus of claim 1 in which the outlet opening in the wall of the delivery tube faces toward the mixing chamber.

3. The apparatus of claim 1 in which the delivery tube is a section of tube which has an open end, and the open end is positioned about the center of the first conduit.

4. An apparatus for mixing a stream of anhydrous ammonia, having a vapor and liquid phase, with a stream containing a liquid additive compound, to obtain a homogeneous vapor-liquid mixture of the anhydrous ammonia and the liquid additive compound, the apparatus comprising:
    a meter regulator means;
    a mixing chamber;
    a first conduit section which connects the meter regulator to the mixing chamber;
    a second conduit section having upper and lower ends, the upper end is positioned inside the mixing chamber, the upper end is defined by a cone-shaped cap attached to the upper lip of the second conduit section by strut members, the strut members are spaced apart to define fluid inlet passages in said upper end, and the lower end connects into a flow equalizer manifold;
    the flow equalizer manifold includes a distribution chamber defined by a top wall, a floor, and a sidewall, the distribution chamber floor has a cone-shaped surface, and the distribution chamber sidewall has outlet openings therein which communicate with a use point;
    the apparatus includes a delivery tube, the tube has a delivery end positioned in the first conduit section between the meter regulator and the mixing chamber, and the delivery end has an outlet opening in the wall of the tube which faces toward the meter regulator.

* * * * *